United States Patent [19]

Chevallier et al.

[11] Patent Number: 5,403,570
[45] Date of Patent: Apr. 4, 1995

[54] DISPERSIBLE SILICA PARTICULATES

[75] Inventors: Yvonick Chevallier, Decines; Michel Rabeyrin, Dardilly, both of France

[73] Assignee: Rhone-Poulenc Chimie, Courbevoie Cedex, France

[21] Appl. No.: 904,565

[22] Filed: Jun. 26, 1992

[30] Foreign Application Priority Data

Jun. 26, 1991 [FR] France ................. 91 07859

[51] Int. Cl.$^6$ ............................................. C01B 33/12
[52] U.S. Cl. ...................................... 423/339; 424/49
[58] Field of Search ................ 423/339, 335; 424/49

[56] References Cited

U.S. PATENT DOCUMENTS

| | | |
|---|---|---|
| 3,860,682 | 1/1975 | Reinhardt et al. |
| 4,076,549 | 2/1978 | Wason . |
| 4,508,607 | 4/1985 | Winyall .................. 204/180 |
| 4,704,425 | 11/1987 | Lagarde et al. ........... 524/492 |
| 4,708,859 | 11/1987 | Chevallier ............... 423/339 |
| 4,842,838 | 6/1989 | Chevallier ............... 423/339 |
| 5,124,143 | 6/1992 | Mühlemann et al. ........ 424/49 |
| 5,286,478 | 2/1994 | Persello ................. 424/49 |

FOREIGN PATENT DOCUMENTS

| | | |
|---|---|---|
| 0249524 | 12/1987 | European Pat. Off. . |
| 0396450 | 11/1990 | European Pat. Off. . |
| 407262 | 1/1991 | European Pat. Off. .......... 423/339 |
| 0407262 | 1/1991 | European Pat. Off. . |
| 1054175 | 12/1951 | France . |
| 1072520 | 12/1952 | France . |
| 710015 | 6/1954 | United Kingdom . |
| 719918 | 12/1954 | United Kingdom . |

OTHER PUBLICATIONS

Wason, J. Soc. Cosmet. Chem. 29, 497–521 (Aug. 1978).
Wason, Pigment Handbook; vol. 1: Properties and Economics (2d ed.), John Wiley & Sons, (1988) pp. 139–159.

*Primary Examiner*—George Fourson
*Assistant Examiner*—Ken Horton
*Attorney, Agent, or Firm*—Burns, Doane, Swecker & Mathis

[57] ABSTRACT

Uniquely dispersible precipitated silica particulates, e.g., beads, powders and granulates/extrudates, very well suited for the reinforcement of elastomer/rubber matrices, e.g., tires for the automotive industry, have characteristic particle sizes, BET and CTAB specific surface areas, DOP oil absorption values, total pore volumes and pore size distributions, and reduced degree of attrition.

53 Claims, No Drawings

DISPERSIBLE SILICA PARTICULATES

BACKGROUND OF THE INVENTION

1. Field of the Invention

The present invention relates to novel precipitated silica particulates, characteristically in the shape of granules, powders or substantially spherical beads, to a process for the preparation thereof, and to the use of same as a reinforcing filler material for elastomeric/rubbery matrices.

2. Description of the Prior Art

Precipitated silica particulates have long been used as a white reinforcing filler in elastomers and, particularly, in tires for the automotive industry.

As is the case with any reinforcing filler material, however, it must be (a) easy to handle and (b) easy to formulate into mixtures thereof.

In this respect, the powder form is not always satisfactory in that, purely from the standpoint of handling and formulation, it may promote considerable dust formation and tedious and inadequate incorporation of the filler (low apparent density). Furthermore, rubber mixing requires very accurate metering techniques, for which powdery fillers are often unsuitable (pourability).

Shaping such filler material into granule form is of course one suitable technique for obviating the above disadvantages, but, unfortunately, it may often provide insufficient dispersion of the filler in the elastomer, and the degree of reinforcement ultimately attained may be lower than could be obtained using a filler initially in powder form.

In general, it is known to this art that, if a filler is to provide optimum reinforcing properties, it must be present in the elastomer matrix in a final form which is both as finely divided as possible and as homogeneously distributed as possible. Thus, in the special case of the filler being introduced initially in granular state, such conditions can be realized only insofar as (a) the granules have a very good capacity for incorporation into the matrix when mixed with the elastomer (incorporability of the granules) and for disintegration or deagglomeration in the form of a very fine powder (disintegration of the granules), and (b) the powder resulting from such disintegrating process can in turn be dispersed completely and homogeneously within the elastomer matrix (dispersion of the powder). It will readily be appreciated that these requirements are incompatible, or even conflict with the very nature of a granulate, considering its inherently dense, compact and resistant character and the relatively high cohesive strength bonding the constituent grains of silica. Preparation of granules of precipitated silica without sacrificing either mechanical strength or capacity for dispersion to date remains a problem of compromise which is difficult to overcome.

Another difficulty resides in that fact that, for reasons of mutual affinity, the silica particles (whether or not they emanate from a prior disintegration of granules) have an unfortunate tendency to agglomerate within the elastomer matrix. These silica/silica interactions promote the deleterious effect of limiting the reinforcing properties to a level well below that which could theoretically be attained if all of the silica/elastomer interactions possible during the mixing operation were in fact obtained. (The theoretical number of silica/elastomer interactions is known to be directly proportional to the external surface area or CTAB surface area of the silica employed).

Moreover, such silica/silica interactions tend to increase the stiffness and thickness of the mixtures, thus rendering them more difficult to use.

SUMMARY OF THE INVENTION

Accordingly, a major object of the present invention is the provision of novel precipitated silica particulates presenting an improved capacity for dispersion (and deagglomeration) and for reinforcing elastomer/rubber matrices. When used as a reinforcing filler material for elastomers, the final product reinforced elastomers have mechanical properties, such as resistance to breaking, tearing and abrasion, which are markedly improved relative to such matrices reinforced with the prior art silicas.

Another object of the present invention is the provision of a novel process for preparing the above precipitated silicas in the form of granules, powder or substantially spherical beads having improved capacity for dispersion (and deagglomeration) and for reinforcement of elastomer/rubber matrices.

Still another object of the invention is the provision of such novel silicas as a reinforcing filler material for elastomers, notably for tires.

Briefly, the present invention features the production of novel precipitated silica particulates, having an improved capacity for dispersion and reinforcement, by reacting a silicate with an acidifying agent, whereby a suspension of precipitated silica is obtained, then separating and drying the resulting suspension, such precipitation comprising:

(a) providing an initial sediment or vessel bottoms which comprises at least a portion of the total amount of silicate required for the reaction and an electrolyte, the concentration of silica in said initial sediment being less than 100 g/l and the concentration of electrolyte in said initial sediment being less than 17 g/l;

(b) adding the acidifying or acid agent to said sediment until the pH of the reaction medium has attained a value of at least about 7;

(c) adding additional acidifying agent to the reaction medium and, if appropriate, the remainder of the silicate simultaneously, whereby a suspension is produced in which the maximum proportion of dry solids is 24% by weight; and (d) drying the suspension thus produced.

DETAILED DESCRIPTION OF THE PREFERRED EMBODIMENTS OF THE INVENTION

More particularly according to the present invention, it has now been found that a low concentration of silica and electrolyte in the initial sediment (or vessel bottoms) and an appropriate proportion of dry solids in the suspension to be dried are significant factors in respect of the actual production of the subject improvedly dispersible precipitated silica particulates well adopted for improvedly reinforcing elastomer/rubber matrices.

It will be appreciated that the process of the present invention generically comprises the synthesis of a precipitated silicate, namely, reacting an acidifying agent with a silicate.

The acidifying agent and silicate are per se well known to this art. Exemplary acidifying agents include the strong inorganic acids such as sulfuric, nitric or hydrochloric, and the organic acids such as acetic, formic or carbonic acids.

The silicate may be any common form, such as the metasilicates, disilicates and, advantageously, an alkali metal silicate, particularly sodium or potassium silicate.

In the event that sodium silicate is used, it typically has an $SiO_2/Na_2O$ weight ratio of from 2 to 4:1 and more particularly from 3.0 to 3.7:1.

Concerning the preparative technique of the invention, the precipitation is carried out in a specific manner, in the following stages:

A sediment, (i.e., a reaction vessel bottoms) is first formed, comprising silicate and an electrolyte. The amount of silicate present in the sediment may be either the total amount required for the reaction or only a portion of that amount.

As regards the "electrolyte" this term is used in its normal sense, i.e., any ionic or molecular species which decomposes or dissociates when in solution, to form ions or charged particles.

Salts selected from among the alkali metal and alkaline earth metal salts are particularly exemplary electrolytes, preferably the salt of the starting material silicate and the acidifying agent, for example sodium sulfate in the case of a reaction between a sodium silicate and sulfuric acid.

An essential feature of the process according to the invention is that the concentration of electrolyte in the initial sediment is less than 17 g/l and preferably less than 14 g/l.

Another essential feature of the subject process is that the concentration of silica in the initial sediment is less than 100 g $SiO_2$ per liter. This concentration is preferably less than 80 g/l and more preferably less than 70 g/l. Particularly when the acid used for the neutralization is in a high concentration, especially over 70%, it is appropriate to conduct the reaction using an initial silicate sediment in which the concentration of $SiO_2$ is less than 80 g/l.

The porosities of the final product silica particulates are partly dependent on the conditions governing the concentration of electrolyte and silica in the initial sediment.

The second stage of the subject process comprises introducing additional acidifying agent into the sediment having the composition described above.

The addition of this agent, which results in a correlated lowering of the pH of the reaction medium, is continued until a pH of at least about 7, generally from 7 to 8, is attained.

Once this value is attained and in the event of an initial sediment comprising only a portion of the total amount of silicate required, it is advantageous to introduce the additional acidifying agent and the remainder of the silicate simultaneously.

The precipitation reaction proper is complete when all of the remaining silicate has been added.

It is advantageous to mature (age) the reaction medium when the precipitation is complete and especially after the aforementioned simultaneous addition; such maturing or aging may require, for example, from 5 minutes to 1 hour.

Nonetheless, in all instances (namely, whether the initial sediment contains the total amount of silica required or only a portion thereof), an additional amount of acidifying agent may be added to the reaction medium after precipitation, optionally in a later stage. The acid agent is generally added until a pH of from 3 to 6.5 and preferably from 4 to 6.5 is attained. Addition of the acid agent permits the pH of the final product silica to be adjusted to a particular value required for a specific application.

The temperature of the reaction medium typically ranges from 70° to 98° C.

In one embodiment of the invention, the reaction is carried out at a constant temperature ranging from 80° to 95° C. In another embodiment, the temperature at the end of the reaction is higher than at the beginning. Thus, the temperature at the beginning of the reaction is preferably maintained at from 70° to 95° C.; it is then increased over a few minutes, preferably to 80° to 98° C. and maintained at that level to the end of the reaction.

A silica pulp is obtained after the operations described immediately above, and is then separated (liquid/solid separation). Such separation typically comprises a filtration, if necessary followed by washing. The filtration may be effected by any suitable technique, for example via a filter press or band filter, or rotating filter under vacuum.

The suspension of precipitated silica thus recovered (filter cake) is then dried.

Another essential feature of the preparative technique according to the invention is that the proportion of dry solids in the suspension immediately before it is dried must be no greater than 24% and preferably no greater than 23% by weight.

The drying step may be effected by any technique per se known to this art.

The preferred technique is spray drying.

Any appropriate type of spray may be used for this purpose, especially turbine, nozzle, liquid pressure or dual fluid sprays.

In another embodiment of the invention, the proportion of dry solids in the suspension to be dried is greater than 18% and preferably greater than 20% by weight. In this event, the drying is generally carried out by spraying using diffusers.

The precipitated silica obtained in accordance with this embodiment of the invention is advantageously in the form of substantially spherical beads, preferably having an average particle size of at least 80 microns. The present invention especially features such essentially spheroidal particulates.

The above amount of dry solids may be obtained in the actual filtering operation, by using a suitable filter which will provide a filter cake having the indicated content. In another technique, dry solids, for example silica in powder form, is added to the filter cake to provide the necessary content (in a subsequent stage of the process of the invention, carried out after filtration).

It should be appreciated that the resultant cake is not typically in a condition which would permit it to be sprayed, principally because of its excessively high viscosity. This phenomenon is well known to the art.

The cake is then subjected to a known disintegrating operation. This may comprise transferring the cake into a colloidal or ball-type mill. One means for lowering the viscosity of the suspension to be sprayed entails the addition of aluminum thereto, particularly in the form of sodium aluminate as described in French Patent FR-A-2,536,380, hereby expressly incorporated by reference. It may be added, in particular, at the stage of actual disintegration.

The drying operation may be followed by a stage of grinding the product recovered, particularly the product obtained by drying the suspension containing greater than 18% by weight of dry solids. The precipitated silica then produced is advantageously in the form of a powder, preferably having a mean size of from 5 to 70 microns.

Products ground to the desired particle size may be separated from any products not of that size, for example by means of vibrating screens of appropriate mesh sizes; products not of the desired size which are thus recovered may be recycled to the grinding operation.

Similarly, in another embodiment of the invention, the suspension to be dried contains less than 18% by weight of dry solids. Drying is generally conducted by means of a turbine-type spray. The precipitated silica thus produced in this embodiment is advantageously in the form of a powder, preferably having a mean particle size of from 5 to 70 microns.

The precipitated silicas in the form of powders according to the invention preferably have a DOP oil absorption value of from 180 to 350 ml/100g, for example from 200 to 345 ml/100g.

In another embodiment of the invention, the dried product (especially that emanating from a suspension containing less than 18% by weight of dry solids) or the ground product may be subjected to an agglomeration stage.

By "agglomeration" is intended any technique for bonding divided materials to convert same into larger, mechanically strong particles.

Such techniques typically include dry compacting, direct compression, wet granulation (i.e., using a binder such as water, silica slurry, or the like) and extrusion. The apparatus used to carry out such techniques is well known to this art and includes, for example, compacting presses, pelleting machines, rotating drum compacting machines, rotating granulators, and extruders.

In accordance with the present invention, the dry compacting technique is preferred. For this purpose, it is advantageous to use a drum-type compacting machine, i.e., one in which the compacting is effected by conveying powdered product between two rolls which are under pressure and rotating in reverse directions. The pressure exerted generally ranges from 15 to 50 bars, preferably from 20 to 35 bars. The mechanical properties and especially the wear resistance of the final products obtained are broadly dependent on such extent of pressure.

When this technique is used, it is advantageous to deaerate the powdered products prior to the compacting stage, such as to remove the air included therein. (This operation is also described as predensification or degassing). This preliminary operation gives better control over the feed of the products to the drums of the press and ensures more regular compacting. The deaeration may be carried out in apparatus which is per se well known to the art, by transferring the powders between porous elements (plates or drums) equipped with a vacuum suction system.

The precipitated silica produced in this embodiment of the invention is advantageously in the form of granules, generally from 1 to 10 mm in particle size and preferably exhibiting a degree of attrition of less than 20%. (The technique for measuring the degree of attrition is described below).

Contrary to the prior art when processing conventional silica powders, it will be appreciated that agglomeration of silica powders prepared according to the invention, via the techniques described above, is eminently reversible in nature, in the sense that the granules obtained can again be disintegrated into the form of a distinctive finely divided powder.

Upon completion of the agglomeration stage, the products may be calibrated to a desired predetermined size, for example by screening, and then packaged for future use.

The precipitated silica powders prepared according to the invention thus present the advantage, inter alia, of providing granules such as those indicated above in a simple, effective and economic manner, especially through conventional shaping operations such as granulation or compacting. These operations do not cause any degradation which could mask or even destroy the excellent reinforcing properties inherent in such powders, in contradistinction to conventional prior art powders.

The present invention thus features novel precipitated silicas in the form of granules, powders or substantially spheroidal beads having a notable capacity for dispersion (and deagglomeration) and outstanding reinforcing properties.

The BET specific surface area described herein is determined by the BRUNAUER—EMMET—TELLER method, described in *The Journal of the American Chemical Society*, vol. 60, page 309 (February 1938) and corresponding to French NFT standard 45007 (November 1987).

The CTAB specific surface area is the external surface area determined in accordance with French NFT standard 45007 (November 1987) (5.12).

DOP oil absorption is determined in accordance with French NFT standard 30-022 (March 1953) using dioctylphthalate.

The fill density in compacted state (DRT) is measured in accordance with French NFT standard 030100.

The pore volumes reported are measured by mercury porosimetry. The pore diameters are calculated by the WASHBURN equation employing an angle of contact theta equal to 130° and a surface tension gamma equal to 484 dynes/cm (MICROMERITICS 9300 porosity meter).

Thus, novel precipitated silicas are prepared according to the present invention in the form of granules having a BET specific surface area ranging from about 140 to 200 $m^2/g$, a CTAB specific surface area ranging from about 140 to 200 $m^2/g$, a degree of attrition of less than 20% and a pore distribution such that the pore volume comprising pores from 175 to 275 Å in diameter is at least 60% of the pore volume comprising pores of no greater than 400 Å in diameter.

As indicated above, such granules exhibit an outstanding capacity for deagglomeration and dispersion. They further provide a far better compromise between use and mechanical properties in the vulcanized state than can be attained by means of the prior art silica granules, even those having equivalent theoretical reinforcing power (i.e., a similar or identical CTAB external specific surface area).

Particular structural features of the granules according to the invention will now be described in more detail.

As indicated above, the granules according to the invention have a BET specific surface area ranging from about 140 to 200 $m^2/g$ and preferably from about 150 to 190 $m^2/g$.

They also have a CTAB specific surface area ranging from about 140 to 200 $m^2/g$ and preferably from 140 to $m^2/g$.

In a preferred embodiment of the invention, such granules have a BET specific surface area/CTAB specific surface area ratio of from 1.0 to 1.2:1, namely, they have low microporosity.

The granules according to the invention have a DOP oil absorption value generally ranging from 150 to 350 ml/100g and more particularly from 180 to 300 ml/100g.

Another important characteristic of the silica granules of the invention is their density. Their fill density in the compacted state (DRT) is generally at least 0.27 and even extends up to 0.37.

As regards the porosity of the granules according to the invention, they typically have a total pore volume of at least 1 cm$^3$/g and more particularly ranging from 1.5 to 2 cm$^3$/g.

Another essential characteristic of the granules according to the invention is, more specifically, the pore volume distribution, and more particularly the distribution of the pore volume provided by the pores no larger than 400 Å in diameter. This volume is particularly important, as it corresponds to the useful (or effective) pore volume of the filler material for reinforcing elastomer/rubber matrices. Analysis of porograms evidences the granules according to the invention to have an exceptional feature, i.e., that at least 60% and preferably at least 65% of the useful pore volume is provided by pores of a diameter within the specific range of from 175 to 275 Å.

This extremely narrow distribution of pore diameters responsible for most of the useful pore volume is apparently the reason for the exceptional capacity for dispersion exhibited by the granules according to the invention, as compared with the prior art granules.

The inherent mechanical strength of the granules according to the invention is ascertained and quantified by means of an attrition test. This basically comprises subjecting the granules to a specific crushing pressure then measuring the amount of fines produced; the amount of fines corresponds to the degree of attrition.

Still more specifically, the degree of attrition is measured by the following procedure: a sample batch of granules is previously sieved on a 400 micron screen (RETSCH screening machine, VIBRO model; stainless steel PROLABO screen; vibration time 5 mn; vibration level 20). The granules retained on the screen (screen residue) are divided into three batches of similar weight, M1, M2 and M3 (the selected such weights are generally from 40 to 60 g). Each batch is then crushed in a manual hydraulic press (FOG press) in the following manner:

(i) the batch is placed into a cylindrical receptacle (diameter 85 mm; thickness 2 mm), then a smooth-surfaced metal cover is gently placed thereover;
(ii) the piston of the press is positioned onto the cover;
(iii) the piston is lowered until a force of 200 kg is applied;
(iv) as soon as the crushing force of 200 kg is attained, the piston is raised.

Each crushed batch is sieved on a 400 micron screen as before, except that the vibration time is set to 2 mn. The weight of the fines which have passed through the screen, m1, m2 and m3 respectively, is then measured.

A respective degree of attrition is thus determined for each of the three batches:

RATE 1 = 100 ml/M1 (%)
RATE 2 = 100 m2/M2 (%)
RATE 3 = 100 m3/M3 (%)

The mean of these three rates (i.e., (RATE 1 + RATE 2 + RATE 3)/3) provides the degree of attrition of the initial sample.

The silica granules of the invention exhibit a degree of attrition of less than 20%. The attrition is preferably less than 15%.

The degree of attrition of the granules according to the invention is directly proportional to the intensity of the mechanical pressures which have previously been applied to agglomerate the particles of the initial powders, by methods hereinbefore described in greater detail. Even with very low degrees of attrition, however, the granules of the invention provide the quite outstanding property of maintaining an excellent capacity for disintegration and dispersion.

This capacity can be quantified by two specific tests, one based on the action of the granules during grinding and the other on their rheological properties after grinding.

Qualitatively, the capacity for disintegration may be assessed by the ease or difficulty with which the granules can be converted into a more finely divided state when subjected to an external mechanical action, such as grinding.

This is tantamount to ascertaining the internal cohesive strength of the granulate indirectly.

Quantitatively, the granules will have less cohesive strength and, hence, a greater capacity for disintegration to the extent that they provide powders of a finer particle size, given an equal amount of external force supplied in mechanical form when they are ground.

Still more specifically, the grinding test is carried out by the following procedure:

The granules are continuously introduced into a cutter-type mill (RETSCH mill, model ZM1) at a constant feed rate of 1.5 kg/h. In this apparatus, grinding is effected by rotation of a metal ring fitted with 24 cutters, the rotary speed being set to 20,000 rpm, and an immobile metal grid (mesh diameter 0.5 mm) is arranged concentrically with the rotor, but in the reverse of the normal position indicated by the manufacturer. The ground product is recovered continuously at the outlet of the mill by means of a cyclone, then analyzed.

The particle sizes of the powders thus recovered are determined by means of a laser granulometer (SYMPATEC), then the mean diameter (D50) or ($\phi$50) of the powders is measured.

In the test, powders recovered after the first pass through the mill can be recycled for a second grinding, strictly following the same procedure as above, and the operation can of course be repeated as often as desired. After each pass through the mill, the mean diameter of the powder recovered is measured. In this manner it is possible to monitor the evolution of the D50 of the powders as a function of the number of passes through the mill.

As will be seen from the examples below, the granules according to the invention have at least two important features which distinguish them from the prior art granules: the first is that, after a single grinding operation, they already provide very fine powders, i.e., powders having a D50 generally below 7 microns; the second is that, after a plurality of successive identical grinding operations, they provide powders which display a regular, significant decrease in the D50, possibly as low as a value of about 4 microns. In other words, the granules can be ground until the powder obtained has a particle size such that its D50 is about 4 microns. Such values indicate the excellent capacity for disintegration of the granules according to the invention. They are evidence that the composite obtained after mixing with the elastomer will be reinforced by a very fine, non-aggregated filler material.

For purposes of comparison, prior art granules which have been ground once provide powders with a higher D50, of over 7.5 microns, and generally on the order of 9 to 10 microns. Even if many subsequent grinding operations are carried out, it is not possible to reduce the D50 to a value below 6 microns.

Another important novel feature of the granules according to the invention are the rheological properties of powders produced by disintegration.

Such properties are ascertained by means of BROOKFIELD viscosity metering, which measures and quantifies the capacity for dispersion (or dispersibility) of the disintegrated granules. BROOKFIELD viscosity metering is carried out on products which have been ground as in the grinding test defined above, and the results are determined by the following procedure:

(i) preparing a dioctylphthalate solution containing 8% by weight of a silica powder as obtained after grinding;
(ii) homogenizing the mixture completely by vigorous agitation (STROEBER agitator: 1,000 rpm for 10 mn);
(iii) heating the mixture to 20° C. (thermostatically controlled bath), the temperature at which metering is to be effected;
(iv) measuring the viscosity of the mixtures by means of a BROOKFIELD RVT viscometer equipped with a No. 3 or 4 paddle;
(v) conducting a first shear at 50 rpm for 2 mn, then a shear at 5 rpm for 3 mn, before taking the measurement.

When the granules of the invention have been ground they have extremely high BROOKFIELD viscosities. Even after one grinding operation, powders having a BROOKFIELD viscosity preferably of at least 10 Pa.s and especially of at least 13 Pa.s are obtained. Furthermore, after a plurality of successive identical grinding operations, the granules produce powders which exhibit a regular, extremely significant increase in BROOKFIELD viscosity, possibly up to at least 30 Pa.s. Stated differently, the granules may be ground until a powder having a BROOKFIELD viscosity of at least 30 Pa.s is obtained. These values reflect the excellent capacity for dispersion of powders obtained after disintegration of the granules of the invention; they are evidence that a completely homogeneous mixture of fine particles of reinforcing silica and elastomeric matrix has been obtained.

Also for purposes of comparison, prior art granules which have been ground once provide powders having a BROOKFIELD viscosity below 10 Pa.s; moreover, if a plurality of successive grinding operations is carried out, less evolution of the BROOKFIELD viscosity of the powders is observed, generally not in excess of 20 Pa.s.

The granules of the invention may be in many different forms. For example, they may be spherical, cylindrical, parallelepipedal, in the form of tablets, wafers, pellets, extrusions or extrudates of circular or polylobal section, or other similar shapes. Their dimensions may be very varied, ranging, e.g., from one to several millimeters, generally from 1 to 10 mm, along the axis of their largest dimension (length); the length/width ratio (the width being defined as the dimension immediately below the length) may itself vary widely, generally from 1 to 10 and more particularly from 1 to 5.

This invention also features a novel precipitated silica in the form of a powder having a BET specific surface area ranging from about 140 to 200 $m^2/g$, a CTAB specific surface area ranging from about 140 to 200 $m^2/g$, a DOP oil absorption value ranging from 180 to 350 ml/100g, and a pore distribution such that the pore volume constituted by pores from 175 to 275 Å in diameter provides at least 50% of the pore volume constituted by pores no larger than 400 Å in diameter.

As indicated above, such silicas are the precursors of choice for synthesizing the granules according to the invention, and, apart from this fact, such granules themselves present important properties. This applies especially to the significant improvement in the compromise between use and final mechanical properties which they provide over the prior art silica powders.

Particular structural properties of the powders according to the invention will now be described.

These powders have a BET specific surface ranging from about 140 to 200 $m^2/g$. It preferably ranges from 150 to 190 $m^2/g$.

As regards their CTAB specific surface area, it also ranges from about 140 to 200 $m^2/g$. It preferably ranges from 140 to 180 $m^2/g$.

In a special preferred embodiment of the invention, the powders have a BET specific surface area/CTAB specific surface area ratio of from 1.0 to 1.2:1, namely, they are slightly microporous.

Their DOP oil absorption value ranges from 180 to 350 ml/100g and more particularly from 200 to 345 ml/100g.

In respect of their fill density in the compacted state (DRT), this is generally at least 0.17 and ranges, for example, from 0.2 to 0.3.

Concerning the porosity properties of the silica powders according to the invention, same typically have a total pore volume of at least 2.5 $cm^3/g$, and generally from 3 to 5 $cm^3/g$.

As with the granules described above, one of the essential characteristics of the silica powders according to the invention is the distribution of their pore volume. Analysis of porograms of the powders according to the invention evidences that the pore volume constituted by pores from 175 to 275 Å in diameter in itself represents at least 50% of the pore volume constituted by pores no greater than 400 Å in diameter (useful pore volume). The aforesaid pore volume preferably is at least 60% of the useful pore volume.

The powders of the invention typically have a mean particle size (D50) of from 5 to 70 microns, preferably from 10 to 30 microns. This corresponds to the particle size best suited for subsequent shaping.

As with the granules, the powders can be characterized by a grinding test and a viscosity test as described earlier.

Thus, after a first grinding operation a powder is obtained, having a mean diameter (D50) preferably less than 7 microns, for example on the order of 6 microns and a BROOKFIELD viscosity preferably of at least 20 Pa.s, generally at least 30 Pa.s. By way of comparison, a D50 of over 7.5 microns and a BROOKFIELD viscosity of less than 20 Pa.s are typically obtained with precipitated silica powders of the prior art.

The capacity for deagglomeration of the powders according to the invention may be quantified by a specific deagglomeration test.

This test is carried out as follows:

The cohesion of agglomerates is assessed by particle size metering (by laser diffraction), conducted on a silica suspension which has previously been deagglomerated by ultrasonics; this measures the capacity of the silica for deagglomeration (comminuting shaped articles from 0.1 mm in size to some tens of microns). Ultrasonic deagglomeration is effected using a VIBRACELL BIOBLOCK (600 W) ultrasonic generator, fitted with a probe 19 mm in diameter. Particle size metering is via laser diffraction on a SYMPATEC granulometer.

2 g of silica are weighed in a pillbox (height 6 cm, diameter 4 cm) and formulated to 50 g with softened water; a 4% aqueous suspension of silica is provided in this manner and homogenized for 2 minutes by magnetic agitation. Ultrasonic deagglomeration is then carried out as follows: with the probe submerged to a depth of 4 cm, the output power is adjusted such as to attain a needle deviation on the power dial indicating 20% (corresponding to 120 watt/cm$^2$ of energy dissipated by the wire end ferrule of the probe). Deagglomeration is effected for 420 seconds. The particle size is then measured when a known volume of the homogenized suspension (expressed in ml) has been introduced into the granulometer tank.

The lower the value obtained for the mean diameter $\phi 50$, the higher will be the capacity of the silica for deagglomeration. The ratio of (10×volume of suspension introduced) to the optical density of the suspension detected by granulometry is also determined (the optical density is on the order of 20%). This ratio indicates the proportion of fines, i.e., the proportion of particles smaller than 0.1 micron which are not detected by the granulometer. The higher this ratio, described as the ultrasonic deagglomeration factor (FD), the greater will be the capacity of the silica for deagglomeration.

The silica in powder form according to the invention exhibits an ultrasonic deagglomeration factor of more than 6 ml and especially more than 6.5 ml.

It also preferably has a mean diameter ($\phi 50$) less than 4.5 microns and particularly less than 4 microns, after ultrasonic deagglomeration.

The excellent properties inherent in the silica powders according to the invention are preserved, even after shaping.

This invention also features a novel precipitated silica in the form of substantially spherical beads having a BET specific surface area ranging from about 140 to 200 m$^2$/g, a CTAB specific surface area ranging from about 140 to 200 m$^2$/g, a mean particle size of at least 80 microns and a pore size distribution such that the pore volume constituted by pores from 175 to 275 Å in diameter represents at least 50% of the pore volume constituted by pores no larger than 400 Å in diameter.

As indicated above, such a silica in the form of substantially spherical beads, which are advantageously solid, homogeneous, non-dust-forming and easily poured, have a very good capacity for deagglomeration and dispersion. It further has excellent reinforcing properties. A silica of this type is also a precursor of choice for synthesizing the powders and granulates according to the invention.

Particular structural properties of the beads according to the invention will now be described.

Such beads have a BET specific surface area ranging from about 140 to 200 m$^2$/g. It preferably ranges from 150 to 190 m$^2$/g.

As regards their CTAB specific surface area, it also ranges from about 140 to 200 m$^2$/g. It preferably ranges from 140 to 180 m$^2$/g.

In a particular preferred embodiment, these beads have a BET specific surface area/CTAB specific surface area ratio of from 1.0 to 1.2:1, namely, they are slightly microporous.

Their DOP oil absorption value typically ranges from 180 to 400 ml/100g and preferably from 200 to 350 ml/100g.

Their fill density in the compacted state (DRT) typically is at least 0.17 and may, for example, range from 0.2 to 0.32.

The silica beads of the invention have a mean particle size of at least 80 microns.

In certain embodiments of the invention, the mean particle size is at least 100 microns and may, for example, be at least 150 microns; it is generally no greater than 300 microns and preferably ranges from 100 to 250 microns. The mean particle size is determined in accordance with French standard NF X 11507 (December 1970) by dry screening and determining the diameter corresponding to a cumulative residue of 50%.

As regards the porosity of the silica beads according to the invention, same typically have a total pore volume of at least 2.5 cm$^3$/g, and generally from 3 to 5 cm$^3$/g.

As with the granules and powders described above, one of the essential properties of the silica beads according to the invention is the distribution of their pore volume. Analysis of porograms of the beads according to the invention evidences that the pore volume constituted pores from 175 to 275 Å in diameter in itself represents at least 50% of the pore volume constituted by pores no larger than 400 Å in diameter (useful pore volume). The aforesaid pore volume preferably represents at least 60% of the useful pore volume.

Also as with the granules and powders, such beads can be characterized by a grinding test and a viscosity test as described above.

Thus, after a first grinding operation a powder is obtained, having a mean diameter (D50) preferably less than 8.5 microns and a BROOKFIELD viscosity of preferably at least 13 Pa.s and generally at least 15 Pa.s.

Furthermore, after a plurality of successive identical grinding operations, powders are produced from these beads which exhibit a regular, extremely significant increase in BROOKFIELD viscosity, even up to at least 30 Pa.s. In other words, the beads may be ground until a powder having a BROOKFIELD viscosity of at least 30 Pa.s is produced.

As with the powders, the beads can be characterized by the deagglomeration test as described above.

Thus, the silica particulates in the form of substantially spherical beads according to the invention preferably display an ultrasonic deagglomeration factor or more than 5.5 ml and, especially, more than 6.4 ml.

The subject spheroidal particulates have a mean diameter ($\phi 50$) of less than 5 microns and, in particular, less than 4.5 microns after ultrasonic deagglomeration.

The silicas of the invention may, for example, be produced via any appropriate embodiment of the preparative technique described above.

The silica particulates according to the present invention are particularly well suited for the reinforcement of natural or synthetic elastomers/rubber, especially tires.

Such silica particulates provide a notably significant improvement in resistance to breaking, tearing and abrasion in tires for the automotive industry; this is particularly useful in the manufacture of tire treads.

In order to further illustrate the present invention and the advantages thereof, the following specific examples are given, it being understood that same are intended only as illustrative and in nowise limitative.

EXAMPLE 1

The following materials were placed into a stainless steel reactor equipped with a propeller-type agitating system and a double-jacketed heater:

(i) 660 liters of water,
(ii) 11.8 kg of $Na_2SO_4$ (electrolyte),
(iii) 323 liters of aqueous sodium silicate having an $SiO_2/Na_2O$ weight ratio of 3.45:1 and a density at 20° C. of 1,230.

The concentration of $SiO_2$ in the sediment (or vessel bottoms) was then 77 g/l. The mixture was heated to a temperature of 82° C. and agitation was maintained. 395 liters of dilute aqueous sulfuric acid having a density at 20° C. of 1.050 were added until a pH value of 7.5 was attained in the reaction medium (measured at the temperature thereof). The reaction temperature was 82° C. during the first 15 minutes of reaction; it was then adjusted from 82° to 95° C. over about 15 minutes, and maintained at 95° C. until the reaction was completed.

77 liters of aqueous sodium silicate of the type described above and 106 liters of sulfuric acid, also of the type described above, were then together added to the reaction medium. The simultaneous addition of acid and silicate was carried out in such manner that the pH of the reaction medium during their addition was constantly maintained at 7.5±0.1. When all of the silicate had been introduced, introduction of the dilute acid was continued for 5 minutes at a flow rate of 310 l/h.

The introduction of the additional acid adjusted the pH of the medium to a value of 5.0.

The total reaction time was fixed at 85 minutes.

A pulp of precipitated silica was thus obtained. It was filtered and washed by means of a filter press, such that a silica cake was ultimately recovered, exhibiting an ignition weight loss of 79% (hence, the proportion of dry solids was 21% by weight).

The filter cake was fluidized by mechanical and chemical action (adding an amount of sodium aluminate corresponding to an $Al/SiO_2$ weight ratio of 3,000 ppm). After this disintegrating operation, a pumpable cake was produced, at a pH of 6.3. It was then spray-dried using a nozzle-type apparatus.

The product thus dried was then ground (FORPLEX percussion mill, model FL1; rotary speed 4,900 rpm) to impart a mean particle size (D50) on the order of 16 microns.

The characteristics of the resulting P1 powder according to the invention were then as follows:

| | |
|---|---|
| BET specific surface area | 170 m²/g |
| CTAB specific surface area | 160 m²/g |
| DOP oil absorption | 300 ml/100 g |
| DRT (fill density) | 0.22 |
| Pore volume V1 constituted by pores of d<400 Å | 0.95 cm³/g |
| Pore volume V2 constituted by pores 175 Å<d<275 Å | 0.54 cm³/g |
| V2/V1 ratio | 57% |

The silica P1 was subjected to grinding and rheology tests as earlier described (RETSCH mill; throughput 1.5 kg/h; grid 0.5 mm).

After one pass through the mill, the mean diameter (D50) of the ground powder was 6.1 micron. The BROOKFIELD viscosity of the ground powder was 32 Pa.s.

The silica P1 was also subjected to the deagglomeration test as described above.

After ultrasonic deagglomeration, the powder P1 had a mean diameter ($\phi$50) of 3.2 microns and an ultrasonic deagglomeration factor (FD) of 8.5 ml.

EXAMPLE 2

Two very common commercial silicas were evaluated for purposes of comparison; they are marketed in powder form by DEGUSSA as reinforcing fillers for elastomers:

(a) SIPERNAT ® 22 powder (PC1)
(b) ULTRASIL VN3 ® powder (PC2)

The characteristics of these powders are reported in Table I below. The Table 1 also reflects the characteristics of the powder P1 according to the invention, by way of comparison.

TABLE I

| | PC1 | PC2 | P1 |
|---|---|---|---|
| BET s.s.a. (m²/g) | 180 | 170 | 170 |
| CTAB s.s.a. (m²/g) | 160 | 155 | 160 |
| DOP oil absorption (ml/100 g) | 300 | 260 | 300 |
| DRT | 0.27 | 0.20 | 0.22 |
| V1 (cm³/g) | 0.84 | 0.93 | 0.95 |
| V2 (cm³/g) | 0.36 | 0.43 | 0.54 |
| V2/V1 (%) | 43 | 46 | 57 |
| D50 after 1 pass (micron) | 9.8 | 7.6 | 6.1 |
| BROOKFIELD viscosity (Pa.s) | 14 | 17 | 32 |
| $\phi$50 (micron) | 7.4 | 9.9 | 3.2 |
| Deagglomeration factor FD (ml) | 3.0 | 2.3 | 8.5 |

EXAMPLE 3

Granules were prepared from the silica powder P1 of Example 1 by compaction using a roll press.

The powders had previously been deaerated by means of a VACUPRESS 160/220 roller-type predensifier. The deaerated powders were then fed continuously and at a constant flow rate into an ALEXANDERWERCK WP 150/120 compacting press (roll diameter 150 mm; roller length 120 mm; rotary speed of rolls 12 rpm). The outlet of the press was equipped with a calibrating system which was adjusted such as to produce compacted products on the order of 2 to 4 mm. The products were then transferred onto a RHEVUM vibrating screen (grid aperture 1.5×4 mm) to separate them from the fines.

Three batches of granules according to the invention were prepared via the above technique. Only the compacting pressure applied by the rolls of the compacting press was varied. Produced were (1) a batch of granules compacted at 20 bars: GR 20; (2) a batch of granules compacted at 25 bars: GR 25; (3) a batch of granules compacted at 30 bars: GR 30.

The characteristics of these granules are reported in Table II. This Table II also reports the results of the grinding and BROOKFIELD viscosity tests after one pass through the RETSCH mill.

RATEM is the value of the degree of attrition of the granules, measured according to the test hereinbefore described.

TABLE II

|  | GR20 | GR25 | GR30 | GRC1 | GRC2 |
|---|---|---|---|---|---|
| BET s.s.a. ($m^2/g$) | 170 | 170 | 170 | 180 | 170 |
| CTAB s.s.a. ($m^2/g$) | 155 | 155 | 155 | 162 | 151 |
| DOP oil absorption (ml/100 g) | 250 | 230 | 210 | 220 | 210 |
| DRT | 0.28 | 0.29 | 0.30 | 0.35 | 0.36 |
| V1 ($cm^3/g$) | 0.88 | 0.88 | 0.88 | 0.89 | 0.88 |
| V2 ($cm^3/g$) | 0.60 | 0.57 | 0.60 | 0.47 | 0.41 |
| $V_2/V_1$ (%) | 68 | 65 | 68 | 53 | 53 |
| RATEM (%) | 17.6 | 14.6 | 12.8 | 11.2 | 13 |
| D50 after 1 pass (micron) | 6.6 | 6.9 | 6.9 | 8.9 | 9.6 |
| BROOKFIELD viscosity (Pa.s) | 17 | 16 | 12 | 7 | 6 |

EXAMPLE 4

Two batches of commercial silica granules (preparative techniques unknown) were evaluated for purposes of comparison:

(c) ULTRASIL VN3 GRANULAR® granules, marketed by DEGUSSA (GRC1)

(d) KS 404 GRANULAR® granules, marketed by AKZO (GRC2)

The characteristics of these granules are reported in Table II above.

EXAMPLE 5

This example compares the evolution of the mean diameters (D50) and corresponding BROOKFIELD viscosities of powders produced after a plurality of successive grinding operations (in tests as described above), for granules GR25 (invention) and granules GRC1 (comparative).

The results are reported in Table III below:

TABLE III

| Number of grinding operations | D50 (μm) GR25 | D50 (μm) GRC1 | BROOKFIELD viscosity (Pa.s) GR25 | BROOKFIELD viscosity (Pa.s) GRC1 |
|---|---|---|---|---|
| 1 | 6.9 | 8.9 | 16 | 7 |
| 2 | 5.1 | 8.7 | 19 | 7 |
| 3 | 4.7 | 8.6 | 25 | 8 |
| 4 | 4.3 | 8.4 | 27 | 7 |
| 5 | 4.1 | 8.3 | 133 | 7 |

EXAMPLE 6

This example illustrates the use and properties of the granules according to the invention and the prior art granules in a formulation for industrial rubber.

The following formulation was used (in parts by weight):

| | |
|---|---|
| S.B.R. 1509 rubber (1) | 100 |
| Silica granules | 50 |
| PERMANAX OD (2) | 2 |
| PEG 4000 (3) | 3 |
| ZnO ACTIF (4) | 3 |
| Stearic acid | 3 |
| Silane Si 69 (5) | 5 |
| Sulfur (6) | 2.25 |
| MBTS (7) | 0.75 |
| DOTG (8) | 1.50 |

(1) styrene butadiene copolymer,
(2) octylated diphenylamine (antioxidant),
(3) polyethylene glycol (silica/rubber interface agent),
(4) rubber quality zinc oxide (activator),
(5) silica/rubber coupling agent (marketed by DEGUSSA),
(6) vulcanizing agent,
(7) benzothiazyl disulfide (vulcanization accelerator),
(8) diorthotolylguanidine (vulcanization accelerator).

The formulations were prepared as follows:

The following materials were introduced into an internal mixer (BANBURY type), in the order given and at the times indicated in parentheses:

SBR 1509 (to);

The PEG 4000, the active ZnO, the Si 69, the PERMANAX OD and ⅔ of the silica (to +1 mn);

The stearic acid and the remainder of the silica (to +2mn, 30s);

The MBTS and DOTG accelerators in the form of a masterbatch in SBR 1509 (to +4 mn).

The formulation was discharged from the mixer when the temperature of the chamber reached 130° C. (i.e., at approximately to +5 mn). The mixture was placed into an open mill which was maintained at 40° C., for calendering. The sulfur was introduced into the mill in the form of a masterbatch in SBR 1509. After homogenization and three fine passes, the final mixture was calendered into the form of sheets 2.5 to 3 mm thick.

The results of these tests were as follows:

1. Rheological Properties

The measurements were taken on the formulations in the crude state. The results are reported in Table IV, which indicates the apparatus employed to record the measurements.

TABLE IV

|  | GR20 | GR25 | GR30 | GRC1 | GRC2 |
|---|---|---|---|---|---|
| MOONEY viscosity (1) | 56.5 | 55 | 53.5 | 61 | 64 |
| Min. Couple (2) | 8 | 7 | 8 | 10 | 10 |
| Max. couple (2) | 100 | 103 | 102 | 106 | 100 |
| Modulus of elasticity (3) | 1.45 | 1.40 | 1.35 | 1.75 | 1.65 |
| Modulus of viscosity (3) | 1.25 | 1.20 | 1.25 | 1.45 | 1.40 |

(1) MOONEY viscosity
(2) MONSANTO 100 s RHEOMETER
(3) MONSANTO MDR 2000E rheometer Formulations produced from the granules of the invention systematically provided the lowest values, both for MOONEY viscosity and for minimum couple and moduli of elasticity and viscosity.

This evidenced that mixtures formulated from the granules of the invention were easier to use, particularly in extrusion and calendering operations which are common to the manufacturing operations. (Less energy was expended in using the mixture, injection during the mixing process was easier, there was less swelling in the die during extrusion, less shrinkage during calendering, etc.).

2 Mechanical Properties

The measurements were obtained from the vulcanized formulations.

Vulcanization was effected by heating the formulations to 150° C. for 15 minutes.

The following standards were employed:
(i) Traction tests (moduli, breaking resistance): NFT 46 002 or ISO 37-1977
(ii) Angular tearing tests (100° C.): NFT 46-007
(iii) Abrasion resistance test: DIN 53-516
The results obtained are reported in Table V below:

TABLE V

|  | GR20 | GR25 | GR30 | GRC1 | GRC2 |
|---|---|---|---|---|---|
| 100% modulus (Mpa) | 3.2 | 3.0 | 3.1 | 3.4 | 3.2 |
| 300% modulus (Mpa) | 11.0 | 10.4 | 11.0 | 9.6 | 9.2 |
| Reinforcement index (1) | 3.4 | 3.4 | 3.5 | 2.8 | 2.8 |
| Breaking resistance (MPa) | 20.4 | 20.4 | 21.3 | 18.6 | 16.7 |
| Abrasion resistance (2) | 91 | 97 | 93 | 113 | 109 |
| Resistance to angular tearing at 100° C. (DaN/cm) | 43 | 42 | 36 | 31 | 31.5 |

(1) Corresponds to the ratio: 300% modulus/100% modulus,
(2) The lower the value measured, the better was the abrasion resistance These latter results clearly demonstrate the superior reinforcing capacity provided by the granules of the invention, as compared with prior art granules, even those having an equivalent theoretical reinforcing capability.

The granules of the invention provided the lowest 100% moduli, which is proof of a higher density of silica/rubber interactions. They consequently gave the highest reinforcement indices.

With regard to abrasion resistance, it will be appreciated that loss by abrasion was 10% to 20% less than that of the comparative granules. This reflects a very important advantage for tire manufacture.

The greater reinforcing strength of the granules according to the invention is also confirmed by the higher values obtained in respect of resistance to breaking and tearing.

EXAMPLE 7

The following materials were placed into a stainless steel reactor equipped with a propeller-type agitating system and a double-jacketed heater:
(i) 772 liters of water,
(ii) 11 kg of $Na_2SO_4$ (electrolyte),
(iii) 211 liters of aqueous sodium silicate, having an $SiO_2/Na_2O$ weight ratio of 3.45:1 and a density at 20° C. of 1.230.

The concentration of $SiO_2$ in the sediment was then 50 g/l. The mixture was related to a temperature of 90° C. and agitation was maintained.

The entire reaction was carried out at 90° C. 275 liters of dilute aqueous sulfuric acid having a density at 20° C. of 1,050 were added to the mixture until a pH of 7.5 (measured at 90° C.) was attained in the reaction medium.

53 liters of aqueous sodium silicate of the type described above and 79 g of sulfuric acid, also of the type described above, were then added to the reaction medium together. The simultaneous introduction of acid and silica was carried out in such manner that the pH of the reaction medium was constantly equal to 7.5±0.1. When all of the silicate had been added, the introduction of dilute acid was continued such as to adjust the pH of the reaction medium to a value of 5.0.

The entire reaction was carried out in 125 min.

A precipitated silica pulp was thus obtained and was filtered and washed by means of a rotating filter under vacuum, such that the silica cake which was ultimately recovered had an 88% ignition weight loss (and hence a proportion of dry solids equal to 12% by weight).

The filter cake was fluidized simply by mechanical action. The resultant pulp was spray-dried using a turbine-type spray.

The properties of the resulting silica P2 in powder form (according to the invention) were then as follows:

| BET specific surface area | 155 $m^2/g$ |
|---|---|
| CTAB specific surface area | 149 $m^2/g$ |
| DOP oil absorption | 330 ml/100 g |
| DRT | 0.18 |
| Pore volume V1 constituted by pores of d < 400 Å | 1.0 $cm^3/g$ |
| Pore volume V2 constituted by pores 175 Å < d < 275 Å | 0.67 $cm^3/g$ |
| V2/V1 ratio | 67% |

The silica P2 was subjected to the grinding and rheology tests as described earlier (RETSCH mill; throughput 1.5 kg/h; grid 0.5 mm).

After one pass through the mill, the mean diameter (D50) of the ground powder produced was 3.7 microns. The BROOKFIELD viscosity of the ground powder was 34 Pa.s.

The silica P2 was also subjected to the deagglomeration test as described earlier.

After ultrasonic deagglomeration, the powder P2 had a mean diameter ($\phi$50) of 2.7 microns and an ultrasonic deagglomeration factor (FD) of 9.5 ml.

EXAMPLE 8

The following materials were placed into a stainless steel reactor equipped with a propeller-type agitating system and a double-jacketed heater.
(i) 669 liters of water,
(ii) 11 kg of $Na_2SO_4$ (electrolyte),
(iii) 314 liters of aqueous sodium silicate having an $SiO_2/Na_2O$ weight ratio of 3.45:1 and a density at 20° C. of 1,230.

The concentration of $SiO_2$ in the sediment was then 75 g/l. The mixture was heated to a temperature of 80° C. and agitation was maintained. 400 l of dilute aqueous sulfuric acid having a density at 20° C. of 1.050 were added until a pH of 7.5 was attained in the reaction medium. The temperature was 80° C. for the first 45 minutes of the reaction; it was then increased from 80° to 85° C. in less than 10 minutes and maintained at 85° C. to the end of the reaction.

Once a pH of 7 was attained, 76 liters of aqueous sodium silicate of the type described above and 120 l of sulfuric acid, also the type described above, were added to the reaction medium together. The simultaneous introduction of acid and silicate was carried out in such manner that the pH of the reaction medium during the period of introduction was constantly equal to 7.5±0.1. When all of the silicate had been added, the introduction of dilute acid was continued for about 10 minutes such as to adjust the pH of the reaction medium to a value of 4.5. The total duration of the reaction was 120 mn.

A precipitated silica pulp was thus obtained and was filtered and washed by means of a rotating filter under vacuum, such that the silica cake which was ultimately recovered exhibited an 87% ignition weight loss (and hence a proportion of dry solids equal to 13% by weight).

The filter cake was fluidized by mechanical and chemical action (adding an amount of sodium aluminate corresponding to an Al/SiO$_2$ weight ratio of 4,000 ppm). After this disintegrating operation, the pH of the cake was 6.5. The cake was spray-dried using a turbine-type spray.

The properties of the resulting silica P3 in powder form (according to the invention) were then as follows:

| | |
|---|---|
| CTAB specific surface area | 180 m$^2$/g |
| BET specific surface area | 190 m$^2$/g |
| DOP oil absorption | 345 ml/100 g |
| DRT | 0.17 |
| Pore volume V1 constituted by pores of d < 400 Å | 0.98 cm$^3$/g |
| Pore volume V2 constituted by pores 175 Å < d < 275 Å | 0.64 cm$^3$/g |
| V2/V1 ratio | 65% |

The silica P3 was subjected to the grinding and rheology tests as described earlier (RETSCH mill; throughput 1.5 kg/h; grid 0.5 mm).

After a single pass through the mill, the mean diameter (D50) of the ground powder produced was 6.5 microns. The BROOKFIELD viscosity of the ground powder was 25 Pa.s.

The silica P3 was also subjected to the deagglomeration test as described above.

After ultrasonic deagglomeration, the powder P3 had a mean diameter ($\phi$50) of 3.6 microns and an ultrasonic deagglomeration factor (FD) of 7.1 ml.

EXAMPLE 9

A precipitation was carried out by the procedure of Example 1.

The resulting precipitated silica pulp was filtered by means of a rotating filter under vacuum, such that the silica cake recovered had an 86% ignition weight loss (and hence a proportion of dry solids equal to 14% by weight).

The filter cake was fluidized by mechanical and chemical action (adding an amount of sodium aluminate corresponding to an Al/SiO$_2$ weight ratio of 3,000 ppm). After this disintegrating operation, the pH of the cake was 6.4. The cake was spray-dried using a turbine-type spray.

The properties of the resulting silica P4 in powder form (according to the invention) were then as follows:

| | |
|---|---|
| CTAB specific surface area | 162 m$^2$/g |
| BET specific surface area | 165 m$^2$/g |
| DOP oil absorption | 345 ml/100 g |
| DRT | 0.18 |
| Pore volume V1 constituted by pores of d < 400 Å | 0.90 cm$^3$/g |
| Pore volume V2 constituted by pores 175 Å < d < 275 Å | 0.60 cm$^3$/g |
| V2/V1 ratio | 66% |

The silica P4 was subjected to the grinding and rheology tests as described above (RETSCH mill; throughput 1.5 kg/h; grid 0.5 mm).

After a single pass through the mill, the mean diameter (D50) of the ground powder produced was 5.7 microns. The BROOKFIELD viscosity of the ground powder was 32 Pa.s.

The silica P4 was also subjected to the deagglomeration test as described earlier.

After ultrasonic deagglomeration, the powder P4 had a mean diameter ($\phi$50) of 2.5 micron and an ultrasonic deagglomeration factor (FD) of 10.5 ml.

EXAMPLE 10

This example illustrates the use and properties of a powder according to the invention and a prior art powder in a formulation for industrial rubber.

The following formulation was used (in parts by weight):

| | |
|---|---|
| S.B.R. 1509 rubber (1) | 40 |
| S.B.R. 1778 rubber (2) | 60 |
| Silica | 35 |
| Active ZnO (3) | 3 |
| Stearic acid | 9.7 |
| C.B.S. (4) | 2.3 |
| D.P.G. (5) | 1 |
| Sulfur (6) | 1.5 |
| Silane Si 69 (7) | 3.5 |

(1) styrene butadiene copolymer, type 1509
(2) styrene butadiene copolymer, type 1778
(3) rubber quality zinc oxide
(4) N-cyclohexyl-2-benzothiazylsulfenamide
(5) Diphenyl guanidine
(6) vulcanizing agent
(7) silica/rubber coupling agent (marketed by DEGUSSA)

The formulations were prepared as follows:

The following materials were introduced into an internal mixer (BANBURY type), in the order given and at the times indicated in parentheses:

SBR 1509 and SBR 1778 (to);

The active ZnO, the Si 69 and ⅔ of the silica (to +1 mn);

The stearic acid and the remainder of the silica (to +2mn 30s);

The CBS and DPG accelerators (to +4 mn).

The material was discharged from the mixer when the temperature of the chamber reached 130° C. (i.e., at approximately to +5 mn). The mixture was placed into an open mill which was maintained at 40° C., for calendering. The sulfur was fed into the mill.

After homogenization and three fine passes, the final mixture was calendered into the form of sheets 2.5 to 3 mm thick.

The results of the tests were as follows:

1. Rheological Properties

The measurements were on the formulations in the crude state at 150° C.

The results obtained are reported in Table VI, which indicates the apparatus used to record the measurements:

TABLE VI

| | P4 | PC2 |
|---|---|---|
| Min. couple (1) | 9.3 | 12.4 |
| Max. couple (2) | 86.5 | 90.6 |

(1) MONSANTO 1 S rheometer

The formulation prepared from the powder of the invention provided the lowest values.

This evidenced that mixtures prepared from the silica powder of the invention were easier to use.

2. Mechanical Properties

The measurements were on the vulcanized formulations.

Vulcanization was effected by heating the formulations to 150° C. for 15 minutes.

The standards used were as indicated in Example 6.

The results obtained are reported in Table VII below:

TABLE VII

|  | P4 | PC2 |
|---|---|---|
| 100% modulus (MPa) | 2 | 2.4 |
| 300% modulus (MPa) | 8.4 | 7.6 |
| Reinforcement index (1) | 4.2 | 3.2 |
| Breaking resistance (MPa) | 12.8 | 9.7 |
| Abrasion resistance (2) | 78 | 97 |

(1) corresponds to the ratio: 300% modulus/100% modulus,
(2) The lower the value measured, the better was the abrasion resistance.

The above results clearly demonstrate the superior extent of reinforcing imparted by the powder of the invention.

The powder according to the invention provided a lower 100% modulus, which is proof of improved silica dispersion. But it also provided a higher 300% modulus, which is proof of a higher density of silica/rubber interaction. It consequently provided a higher reinforcement index.

With regard to abrasion resistance, it will be appreciated that loss by abrasion was 20% less than with the prior art powder.

The higher extent of reinforcing of the silica in powder form according to the invention was also confirmed by the high values obtained for resistance to breaking and tearing.

EXAMPLE 11

The following materials were introduced into a stainless steel reactor equipped with a propeller-type agitating system and a double-jacketed heater:

(i) 346 liters of water,
(ii) 7.5 kg of $Na_2SO_4$ (electrolyte),
(iii) 587 liters of aqueous sodium silicate having an $SiO_2/Na_2O$ weight ratio of 3.50:1 and a density at 20° C. of 1.133.

The concentration of $SiO_2$ in the sediment was then 85 g/l. The mixture was heated to a temperature of 79° C. and agitation was maintained. 386 l of dilute aqueous sulfuric acid having a density at 20° C. of 1.050 were added until a pH of 8 was attained (measured at the temperature of the medium). The temperature of the reaction medium was 79° for the first 25 minutes of the reaction; it was then increased from 79° to 86° C. over 15 minutes and maintained at 86° C. to the end of the reaction.

Once a pH value of 8 was attained, 82 liters of aqueous sodium silicate having an $SiO_2/Na_2O$ weight ratio of 3.50:1 and a density at 20° C. of 1.133, and 132 l of acid of the type described above, were added to the reaction medium together. The simultaneous introduction of acid and silicate was carried out in such manner that the pH of the reaction medium during the period of introduction was constantly equal to 8±0.1. When all of the silicate had been added, the introduction of dilute acid was continued for 9 minutes such as to adjust the pH of the reaction medium to a value of 5.2. The introduction of acid was then terminated and agitation of the reaction pulp was maintained for an additional 5 mn.

The total duration of the reaction was 118 mn.

A precipitated silica pulp was thus produced and was filtered and washed by means of a filter press, such that the silica cake which was ultimately recovered had a 78.5% ignition weight loss (and hence a proportion of dry solids equal to 21.5% by weight).

The filter cake was fluidized by mechanical and chemical action (adding an amount of sodium aluminate corresponding to an $Al/SiO_2$ weight ratio of 3,000 ppm). After this disintegrating operation, a pumpable cake having a pH of 6.5 was obtained. The cake was spray-dried using a nozzle-type spray.

The properties of the resulting silica P5 obtained in the form of substantially spherical beads (according to the invention) were then as follows:

| CTAB specific surface area | 158 $m^2/g$ |
|---|---|
| BET specific surface area | 166 $m^2/g$ |
| DOP oil absorption | 270 ml/100 g |
| DRT | 0.28 |
| Pore volume V1 constituted by pores of d < 400 Å | 0.92 $cm^3/g$ |
| Pore volume V2 constituted by pores 175 Å < d < 275 Å | 0.57 $cm^3/g$ |
| V2/V1 ratio | 62% |
| Mean size of beads | 270 micron |

The silica P5 was subjected to the grinding and rheology tests as described earlier (RETSCH mill; throughput 1.5 kg/h; grid 0.5 mm).

After a single pass though the mill, the mean diameter (D50) of the ground powder produced was 8.4 microns. The BROOKFIELD viscosity of the ground powder was 19 Pa.s.

The silica P5 was also subjected to the deagglomeration test as described above.

After ultrasonic deagglomeration, the powder P5 had a mean diameter ($\phi 50$) of 3.6 microns and an ultrasonic deagglomeration factor (FD) of 6.8 ml.

EXAMPLE 12

A precipitation was carried out following the procedure of Example 1.

The precipitated silica pulp obtained was also filtered by means of a filter press, such that the silica cake recovered had a 79% ignition weight loss (and hence a proportion of dry solids equal to 21% by weight).

The filter cake was fluidized by mechanical and chemical action (adding an amount of sodium aluminate corresponding to an $Al/SiO_2$ weight ratio of 3,000 ppm). After this disintegrating operation, a pumpable cake having a pH of 6.3 was obtained. The cake was spray-dried using a nozzle-type spray.

The properties of the silica P6 obtained in the form of substantially spherical beads (according to the invention) were then as follows:

| CTAB specific surface area | 160 $m^2/g$ |
|---|---|
| BET specific surface area | 170 $m^2/g$ |
| DOP oil absorption | 276 ml/100 g |
| DRT | 0.28 |
| Pore volume V1 constituted by pores of d < 400 Å | 0.90 $cm^3/g$ |
| Pore volume V2 constituted by pores 175 Å < d < 275 Å | 0.55 $cm^3/g$ |
| V2/V1 ratio | 61% |
| Mean size of beads | 260 micron |

The silica P6 was subjected to the grinding and rheology tests as described earlier (RETSCH mill; throughput 1.5 kg/h; grid 0.5 mm).

After a single pass through the mill, the mean diameter (D50) of the ground powder produced was 8.4 microns. The BROOKFIELD viscosity of the ground powder was 18 Pa.s.

The silica P6 was also subjected to the deagglomeration test as described above.

After ultrasonic deagglomeration, the powder P6 had a mean diameter ($\phi$50) of 4.3 microns and an ultrasonic deagglomeration factor (FD) of 6.5 ml.

EXAMPLE 13

A commercial silica marketed in the form of substantially spherical beads by RHONE-POULENC CHIMIE as a reinforcing filler for elastomers, the silica ZEOSIL® 175 MP (referred to as MP1 below) was evaluated for purposes of comparison.

The properties of these powders are reported in Table VIII below. Table VIII also reports the properties of silica P6 according to the invention, by way of comparison:

TABLE VIII

|  | MP1 | P6 |
| --- | --- | --- |
| BET s.s.a. (m²/g) | 175 | 170 |
| CTAB s.s.a. (m²/g) | 162 | 160 |
| DOP oil absorption (ml/100 g) | 280 | 276 |
| DRT | 0.27 | 0.28 |
| V1 (cm 3/g) | 0.95 | 0.90 |
| V2 (cm³/g) | 0.45 | 0.55 |
| V2/V1 (%) | 47 | 61 |
| Mean size of beads (micron) | 265 | 260 |
| D50 after 1 pass (micron) | 10.5 | 8.2 |
| BROOKFIELD viscosity (Pa.s.) | 7 | 18 |
| $\phi$ (micron) | 9.1 | 4.3 |
| Deagglomeration factor FD (ml) | 2.1 | 6.5 |

EXAMPLE 14

This example compares the evolution of the BROOKFIELD viscosities of powders obtained after a plurality of successive grinding operations (in tests as described earlier), for silica P6 (invention) and the silicas MP1 and PC1 (comparative).

The results are reported in Table IX below:

TABLE IX

| Number of grinding operations | BROOKFIELD viscosity (Pa.s) | | |
| --- | --- | --- | --- |
|  | P6 | MP1 | PC1 |
| 1 | 18 | 7 | 14 |
| 2 | 32 | 13 | 18 |
| 3 | 35 | 17 | 20 |
| 4 | 34 | 16 | 21 |
| 5 | 40 | 17 | 22 |

EXAMPLE 15

This example illustrates the use of beads according to the invention and prior art beads in a formulation for industrial rubber.

The formulation used was the same as that used in Example 10. The method of preparing it also corresponded to that described in Example 10.

The results of the tests were as follows:

1. Rheological Properties

The measurements were taken on the formulations in the crude state at 150° C.

The results obtained are reported in Table X, which indicates the apparatus used to record the measurements:

TABLE X

|  | P6 | MP1 |
| --- | --- | --- |
| Min. couple (1) | 9.9 | 12.9 |
| Max. couple (1) | 90.3 | 94.5 |

(1) MONSANTO 100S rheometer

The formulation prepared from the beads of the invention provided the lowest values.

This evidenced that mixtures prepared from the silica beads of the invention were easier to use.

2. Mechanical Properties

The measurements were taken on vulcanized formulations.

The vulcanization was effected by heating the formulations to 150° C. for 15 minutes.

The standards used were as indicated in Example 6.

The results obtained are reported in Table XI below:

TABLE XI

|  | P6 | MP1 |
| --- | --- | --- |
| 100% modulus (MPa) | 2.1 | 2.5 |
| 300% modulus (MPa) | 8.7 | 8.5 |
| Reinforcement index (1) | 4.1 | 3.4 |
| Breaking resistance (MPa) | 12.4 | 10.4 |
| Abrasion resistance (2) | 82 | 90 |

(1) Corresponds to the ratio: 300% modulus/100% modulus,
(2) The lower the value measured, the better the abrasion resistance.

These results clearly demonstrate the superior extent of reinforcing imparted by the beads of the invention.

The beads of the invention provided a lower 100% modulus, which is proof of improved silica dispersion. But they also provided a higher 300% modulus, which is proof of a higher density of silica/rubber interactions. They consequently gave a higher reinforcement index.

With regard to abrasion resistance, loss by abrasion was 10% less than that of the prior art beads.

The higher extent of reinforcing provided by the silica in the form of substantially spherical beads according to the invention was also confirmed by the high value obtained for resistance to breaking.

EXAMPLE 16

The following materials were introduced into a stainless steel reactor equipped with a propeller-type agitating system and a double-jacketed heater:
(i) 787 liters of water
(ii) 13.2 kg of $Na_2SO_4$ (electrolyte),
(iii) 196 liters of aqueous sodium silicate having an $SiO_2/Na_2O$ weight ratio of 3.52:1 and a density at 20° C. of 1.230.

The concentration of $SiO_2$ in the sediment was then 47 g/l. The mixture was heated to 85° C. and agitation was maintained.

The entire reaction was carried out at 85° C. 212 l of dilute aqueous sulfuric acid having a density at 20° C. of 1.050 were added until a pH of 8 was attained (measured at 85° C.). 54 liters of aqueous sodium silicate of the type described above, and 75 l of sulfuric acid, also of the type described above, were added to the reaction medium together. The simultaneous introduction of acid and silicate was carried out in such manner that the pH of the reaction medium was constantly equal to 8±0.1.

When all of the silicate had been added, the introduction of dilute acid was continued for 8 minutes such as to adjust the pH of the reaction medium to a value of 5.2. The introduction of acid was then stopped and agitation of the reaction pulp was maintained for an additional 5 mn.

The total duration of the reaction was 115 mn.

A precipitated silica pulp was thus obtained and was filtered and washed by means of a filter press, such that the silica cake which was ultimately recovered had a 79.5% ignition weight loss (and hence a proportion of dry solids equal to 20.5% by weight).

The filter cake was fluidized by mechanical and chemical action (adding an amount of sodium aluminate corresponding to an Al/SiO$_2$ weight ratio of 4,000 ppm). After this disintegrating operation, a pumpable cake having a pH of 6.4 was obtained. The cake was spray-dried using a nozzle-type spray.

The properties of the resulting silica P7 in the form of substantially spherical beads (according to the invention) were then as follows:

| | |
|---|---|
| CTAB specific surface area | 154 m$^2$/g |
| BET specific surface area | 167 m$^2$/g |
| DOP oil absorption | 282 ml/100 g |
| DRT | 0.27 |
| Pore volume V1 constituted by pores of d < 400 Å | 0.90 cm$^3$/g |
| Pore volume V2 constituted by pores 175 Å < d < 275 Å | 0.57 cm$^3$/g |
| V2/V1 ratio | 63% |
| Mean size of beads | 270 micron |

The silica P7 was subjected to the grinding and rheology tests as described earlier (RETSCH mill; throughput 1.5 kg/h; grid 0.5 mm).

After a single pass through the mill, the mean diameter (D50) of the resulting ground powder was 7.8 microns. The BROOKFIELD viscosity of this ground powder was 24 Pa.s.

The silica P7 was also subjected to the deagglomeration test as described above.

After ultrasonic deagglomeration, the powder P7 had a mean diameter ($\phi$50) of 3.2 microns and an ultrasonic deagglomeration factor (FD) of 8.6 ml.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A precipitated silica powder having a BET specific surface area ranging from 140 to 200 m$^2$/g, a CTAB specific surface area ranging from 140 to 200 m$^2$/g, a DOP oil absorption ranging from 180 to 350 ml/100 g, and a pore size distribution such that the pore volume provided by pores ranging from 175 to 275 Å in diameter constitutes at least 50% of the pore volume provided by the pores having diameters no greater than 400Å.

2. The precipitated silica powder as defined by claim 1, having a fill density in compacted state of at least 0.17.

3. The precipitated silica powder as defined by claim 2, having a fill density in compacted state ranging from 0.2 to 0.3.

4. The precipitated silica powder as defined by claim 2, the BET/CTAB specific surface area ratio of which ranging from 1.0 to 1.2:1.

5. The precipitated silica powder as defined by claim 1, having a mean particle size ranging from 10 to 30 microns.

6. The precipitated silica powder as defined by claim 1, having a BET specific surface area ranging from 150 to 190 m$^2$/g, a CTAB specific surface area ranging from 140 to 180 m$^2$/g and a DOP oil absorption ranging from 200 to 345 ml/100 g.

7. The precipitated silica powder as defined by claim 1, having a total pore volume ranging from about 3 to 5 cm$^3$/g.

8. The precipitated silica powder as defined by claim 1, having a pore size distribution such that the pore volume provided by pores ranging from 175 to 275 Å in diameter constitutes at least 60% of the pore volume provided by the pores having diameters no greater than 400Å.

9. The precipitated silica powder as defined by claim 1, exhibiting an ultrasonic deagglomeration factor of more than 6 ml.

10. The precipitated silica powder as defined by claim 9, exhibiting an ultrasonic deagglomeration factor of more than 6.5 ml.

11. The precipitated silica powder as defined by claim 1, having a mean particle diameter of less than 4.5 microns after ultrasonic deagglomeration.

12. The precipitated silica powder as defined by claim 11, having a mean particle diameter of less than 4 microns after ultrasonic deagglomeration.

13. The precipitated silica powder as defined by claim 1, having a mean particle diameter of less than 7 microns and a BROOKFIELD viscosity of at least 20 Pa.s after a first grinding thereof.

14. The precipitated silica powder as defined by claim 13, having a mean particle diameter on the order of 6 microns and a BROOKFIELD viscosity of at least 30 Pa.s after a first grinding thereof.

15. Solid, homogeneous, spherical precipitated silica beads having a mean particle size of at least 80 microns, a BET specific surface area ranging from 140 to 200 m$^2$/g, a CTAB specific surface area ranging from 140 to 200 m$^2$/g, total pore volume of at least 2.5 cm$^3$/g and a pore size distribution such that the pore volume provided by pores ranging from 175 to 275 Å in diameter constitutes at least 50% of the pore volume provided by the pores having diameters no greater than 400Å.

16. The precipitated silica beads as defined by claim 15, having a fill density in compacted state of at least 0.17.

17. The precipitated silica beads as defined by claim 16, having a fill density in compacted state ranging from 0.2 to 0.32.

18. The precipitated silica beads as defined by claim 15, the BET/CTAB specific surface area ratio of which ranging from 1.0 to 1.2:1.

19. The precipitated silica beads as defined by claim 15, having a mean particle size of at least 100 microns.

20. The precipitated silica beads as defined by claim 19, having a mean particle size of at least 150 microns.

21. The precipitated silica beads as defined by claim 15, having a mean particle size of up to 300 microns.

22. The precipitated silica beads as defined by claim 21, having a mean particle size ranging from 100 to 250 microns.

23. The precipitated silica beads as defined by claim 15, having a BET specific surface area ranging from 150 to 190 m$^2$/g, a CTAB specific surface area ranging from 140 to 180 m²/g, and a DOP oil absorption ranging from 200 to 350 ml/100 g.

24. The precipitated silica beads as defined by claim 15, having a total pore volume ranging from about 3 to 5 cm³/g.

25. The precipitated silica beads as defined by claim 15, having a pore size distribution such that the pore volume provided by pores ranging from 175 to 275 Å in diameter constitutes at least 60% of the pore volume provided by the pores having diameters no greater than 400Å.

26. The precipitated silica beads as defined by claim 15, exhibiting an ultrasonic deagglomeration factor of more than 5.5 ml.

27. The precipitated silica beads as defined by claim 26, exhibiting an ultrasonic deagglomeration factor of more than 6.4 ml.

28. The precipitated silica beads as defined by claim 15, having a mean particle diameter of less than 5 microns after ultrasonic deagglomeration.

29. The precipitated silica beads as defined by claim 28, having a mean particle diameter of less than 4.5 microns after ultrasonic deagglomeration.

30. The precipitated silica beads as defined by claim 15, having a mean particle diameter of less than 8.5 microns and a BROOKFIELD viscosity of at last 13 Pa.s after a first grinding thereof.

31. The precipitated silica beads as defined by claim 30, having a BROOKFIELD viscosity of at least 30 Pa.s after a plurality of grindings thereof.

32. A precipitated silica shaped article, having a BET specific surface area ranging from 140 to 200 m²/g, a CTAB specific surface area ranging from 140 to 200 m²/g, a DOP oil absorption ranging from 150 to 350 ml/100 g, a pore size distribution such that the pore volume provided by pores ranging from 175 to 275 Å in diameter constitutes at least 60% of the pore volume provided by the pores having diameters no greater than 400 Å and exhibiting a degree of attrition of less than 20%.

33. The precipitated silica shaped article as defined by claim 32, exhibiting a degree of attrition of less than 15%.

34. The precipitated silica shaped article a defined by claim 32, having a fill density in compacted state of at least 0.27.

35. The precipitated silica shaped article as defined by claim 34, having a fill density in compacted state of up to 0.37.

36. The precipitated silica shaped article as defined by claim 32, the BET/CTAB specific surface area ratio of which ranging from 1.0 to 1.2:1.

37. The precipitated silica shaped article as defined by claim 32, having a BET specific surface area ranging from 150 to 190 m²/g, a CTAB specific surface area ranging from 140 to 180 m²/g and a DOP oil absorption ranging from 180 to 300 ml/100 g.

38. The precipitated silica shaped article as defined by claim 32, having a total pore volume ranging from about 1.5 to cm³/g.

39. The precipitated silica shaped article as defined by claim 32, having a pore size distribution such that the pore volume provided by pores ranging from 175 to 275 Å in diameter constitutes at least 65% of the pore volume provided by the pores having diameters no greater than 400Å.

40. The precipitated silica shaped article as defined by claim 32, having a mean particle diameter of less than about 7 microns and a BROOKFIELD viscosity of at least 10 Pa.s after a first grinding thereof.

41. The precipitated silica shaped article as defined by claim 40, having a mean particle diameter of less than 6 microns and a BROOKFIELD viscosity of up to 30 Pa.s after a plurality of grindings thereof.

42. The precipitated silica shaped article as defined by claim 32, comprising an agglomerated powder.

43. The precipitated silica shaped article as defined by claim 32, comprising a granulate.

44. The precipitated silica shaped article as defined by claim 32, comprising an extrudate.

45. The precipitated silica shaped article as defined by claim 32, spherical, cylindrical or parallelpipedal in geometric configuration.

46. The precipitated silica shaped article as defined by claim 32, comprising a tablet, pellet or wafer.

47. Precipitated silica particulates prepared by reacting a silicate with an acid agent, comprising (i) introducing such acid agent into a liquid reaction medium which comprises at least a portion of the silicate required for complete reaction and an electrolyte, to adjust the pH of said reaction medium to a value of at least 7, the concentration of silica in said reaction medium being less than 100 g/l anal that of the electrolyte being less than 17 g/l, (ii) next introducing additional acid agent and any remaining required silicate into said reaction medium to produce a suspension of precipitated silica particulates having a dry solids content of no greater than 24 % by weight, and (iii) recovering and drying said precipitated silica particulates.

48. The precipitated silica particulates prepared by the process as defined by claim 47, comprising (iii) spray-drying said precipitated silica particulates.

49. The precipitated silica particulates prepared by the process as defined by claim 47, further comprising (iv) comminuting the dried, precipitated silica particulates.

50. The precipitated silica particulates prepared by the process as defined by claim 49, further comprising (v) agglomerating the precipitated silica particulates thus comminuted.

51. The precipitated silica powder as defined by claim 1, having a total pore volume of at least 2.5 cm³/g and a mean particle size ranging from 5 to 70 microns.

52. The precipitated silica beads as defined by claim 15, having a DOP oil absorption ranging from 180 to 400 ml/100g.

53. The precipitated silica shaped article as defined by claim 32, having a total pore volume of at least 1 cm³/g and from 1 to 10 mm in size.

* * * * *